(12) United States Patent
Angell

(10) Patent No.: US 7,716,135 B2
(45) Date of Patent: May 11, 2010

(54) INCREMENTAL COMPLIANCE ENVIRONMENT, AN ENTERPRISE-WIDE SYSTEM FOR DETECTING FRAUD

(75) Inventor: Robert Lee Angell, Salt Lake City, UT (US)

(73) Assignee: International Business Machines Corporation, Armonk, NY (US)

( * ) Notice: Subject to any disclaimer, the term of this patent is extended or adjusted under 35 U.S.C. 154(b) by 1281 days.

(21) Appl. No.: 10/768,334

(22) Filed: Jan. 29, 2004

(65) Prior Publication Data

US 2005/0182712 A1   Aug. 18, 2005

(51) Int. Cl.
*G06Q 40/00* (2006.01)
(52) U.S. Cl. ........................................... 705/44
(58) Field of Classification Search .................... 705/44
See application file for complete search history.

(56) References Cited

U.S. PATENT DOCUMENTS

| 5,884,289 | A |   | 3/1999 | Anderson et al. | 705/44 |
| 6,047,221 | A | * | 4/2000 | Piche et al. | 700/44 |
| 6,330,546 | B1 |   | 12/2001 | Gopinathan et al. | 705/35 |
| 7,263,506 | B2 | * | 8/2007 | Lee et al. | 705/38 |
| 7,333,923 | B1 | * | 2/2008 | Yamanishi et al. | 703/2 |
| 7,353,214 | B2 | * | 4/2008 | Yamanishi et al. | 706/46 |
| 2002/0133721 | A1 |   | 9/2002 | Adjaoute | 713/201 |
| 2004/0039548 | A1 | * | 2/2004 | Selby et al. | 702/179 |

FOREIGN PATENT DOCUMENTS

| WO | WO 97/00483 | 1/1997 |
| WO | WO 01/77960 | 10/2001 |

* cited by examiner

*Primary Examiner*—James A. Kramer
*Assistant Examiner*—James A Vezeris
(74) *Attorney, Agent, or Firm*—Yee & Associates, P.C.; John R. Pivnichny

(57) ABSTRACT

A dynamically determined data-driven model for detecting fraudulent behavior is provided. An initial model is developed using historical data, such as demographic, psychographic, transactional, and environmental data, using data-driven discovery techniques, such as data mining, and may be validated using additional statistical techniques. The noise within the data models determine appropriate initial control points needed for the initial model. These initial control points define an 'electronic fence,' wherein data points within the fence represent acceptable behavior and data points outside the fence represent unacceptable behavior. Updated data is received. A fraud detection mechanism validates the updated data using data mining and statistical methods. The data model, or 'electronic fence,' is refined based on the newly acquired data. The process of refining and updating the data models is iterated until a set of limits is achieved. When the data models reach a steady state, the models are treated as static models.

19 Claims, 6 Drawing Sheets

INCREMENTAL COMPLIANCE ENVIRONMENT, AN ENTERPRISE-WIDE SYSTEM FOR DETECTING FRAUD

BACKGROUND OF THE INVENTION

1. Technical Field

The present invention relates to data processing and, in particular, to fraud detection. Still more particularly, the present invention provides a method, apparatus, and program for detecting fraud using a system of dynamic, data-driven models.

2. Description of Related Art

Most banks throughout the world experience fraudulent behavior. One of the most common example of this behavior is credit card fraud where either a credit card number or even a physical credit card is stolen thereby forcing the bank to absorb an unauthorized charge. A credit card number is at risk of being stolen every time a salesperson or waitperson takes a card out of the sight of the customer, every time a credit card number is spoken over the telephone, or every time a purchase is made online. There have been recent attacks on electronic commerce Web sites in which thousands of credit card numbers were stolen at once. Some unscrupulous people even dig through garbage bins looking for credit card numbers.

Once a credit card number is stolen and compromised, it may be used in many ways. Some thieves make many small purchases hoping they go unnoticed. Others go on one wild shopping spree. The only protection the credit card owner and the issuer have is the signature. For many years, this was an accepted risk. Merchants agreed to accept credit card payments for the convenience of their customers knowing that the customer's signature was their only protection against fraud. However, consumers have grown more and more comfortable with electronic commerce and, as a consequence, credit card fraud has reached alarming levels. For example, a large bank in Caracas Venezuela was losing over one million dollars a month due to various fraudulent activity, including fraudulent credit card charges. For every instance of credit card fraud, either the account holder, the merchant, or the account issuer has to eat the cost, as in the above example.

Other forms of fraudulent activity may also be used, one example being account kiting. An account holder will write a check drawn against a first account at a first financial institution and deposit it into a second account at a second financial institution. Before the funds are collected from the first financial institution, a check is drawn against the balance of the second account and deposited into the first account to cover the amount of the check. As the account holder continues this process, checks are drawn against balances in both accounts. Typically, the balances escalate because the kiter writes the check for more than the amount of that clearing, and will keep the excess amount in cash. The kiter may then repeat this process indefinitely, increasing the amount of the checks and withdrawing a substantial amount of cash each time.

Enterprises other than banks also experience fraudulent behavior. Employees may file fraudulent expense reports, for example. Many solutions have been proposed for preventing fraud. However, those who commit fraud spend just as much effort to circumvent these solutions. While fraud may be impeded using digital cryptography, personal identification numbers, and other security measures, fraudulent behavior will always be an ongoing concern.

Solutions have also been proposed to detect fraud. Many of these solutions use static data-driven and statistical models, based on historical data, to detect behavior that is outside the account holder's usual behavior. However, modeling an account holder's total behavior is too complex and computation intensive. These solutions are typically ineffective. Even if the proper controls and procedures are in place, they are not properly and uniformly enforced. Many banks and other institutions still have fraud occurring throughout the enterprise. Most of the time they do not have the capability or expertise to identify, quantify, eliminate, or even minimize this undesirable behavior.

SUMMARY OF THE INVENTION

The present invention recognizes the disadvantages of the prior art and provides a dynamic, data-driven model for detecting fraudulent behavior. An initial model is developed using historical demographic, psychographic, and transactional data using data-driven techniques, such as data mining, and statistical techniques. The outliers or noise within the distributions of the data models determine appropriate initial control points needed for the model or models. These initial control points define an "electronic fence," wherein data points within the "fence" represent acceptable behavior and data points outside the "fence" represent unacceptable behavior. The initial parameters of the models developed are not known a priori and are discovered using several data mining techniques. Subsequent environmental, transactional, and psychographic data are continually received and processed iteratively until a steady state is achieved. The present invention also validates the current models using data mining techniques and statistical methods. The data models, or "electronic fence," are continuously refined based on the data input. The process of refining the data model is iterated until a set of limits is achieved and when the data model reaches a steady state, the model may be treated as a static model or black box. If the behavior becomes volatile, the process of refining the data model will be invoked to adjust the data model to the new behavior.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
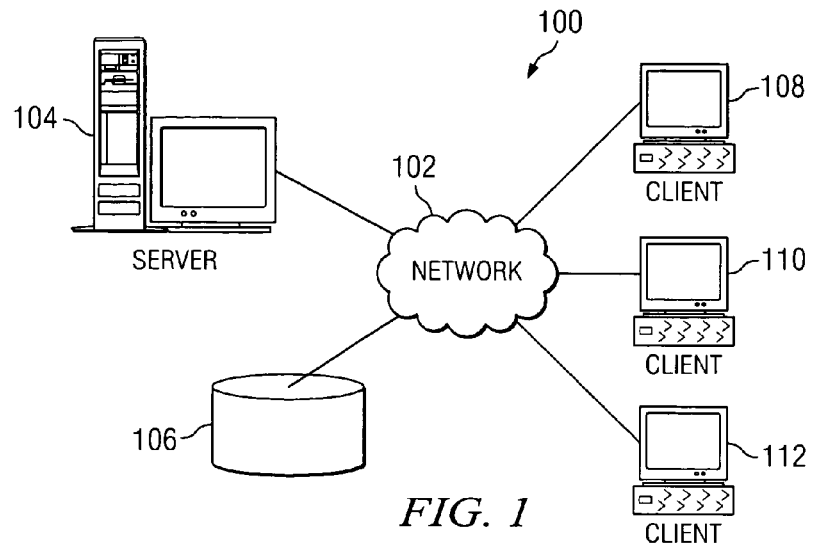
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The present invention provides a method, apparatus, and program for detecting fraud using a dynamic, data-driven model. Behavior data, such as financial transactions, personal data, time and location data, and purchase information may be obtained from one or more sources in a distributed data processing system, such as network data processing system 100. For example, product data may be obtained from retailer databases, third party data providers, and the like, which may be located remotely but accessible through the network 102. Transaction data may be received, through network data processing system 100, from point-of-sale terminals or electronic commerce Web sites (not shown). This behavior data may be stored in a database, such as data storage unit 106.

The present invention may be implemented in a client device or a server. For example, the present invention may be implemented in a server, such as server 104, that obtains behavior data from the various sources via the network 102. In response to a request from a client device, such as client device 112, the server 104 may evaluate this behavior data using data mining technologies and statistical methods. The present invention develops a first model using historical behavioral and transactional data using data-driven and statistical techniques. The distributions of the data determine appropriate initial control points needed for the model. The first set of control points define an "electronic fence" wherein data points within the fence represent acceptable behavior and data points outside the fence represent unacceptable behavior.

Current environmental, transactional, and psychographic data are received from various sources in network data processing system 100. The present invention validates the current data using data mining techniques and statistical methods. The data model, or "electronic fence," is refined based on the current data. The process of refining the data model may be iterated until a set of limits is achieved. When the data model reaches a steady state, the model may be treated as a static model. If the behavior becomes volatile, the process of refining the data model may be invoked to adjust the data model to the new behavior.

Figure 2:
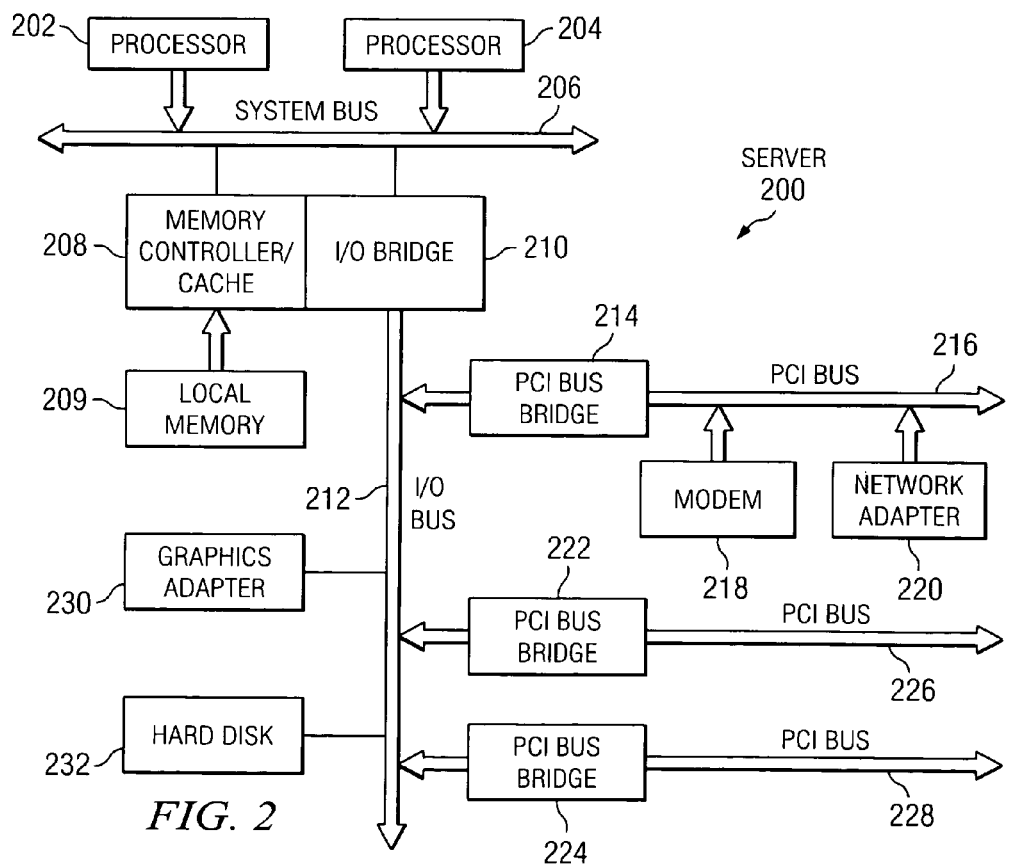
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
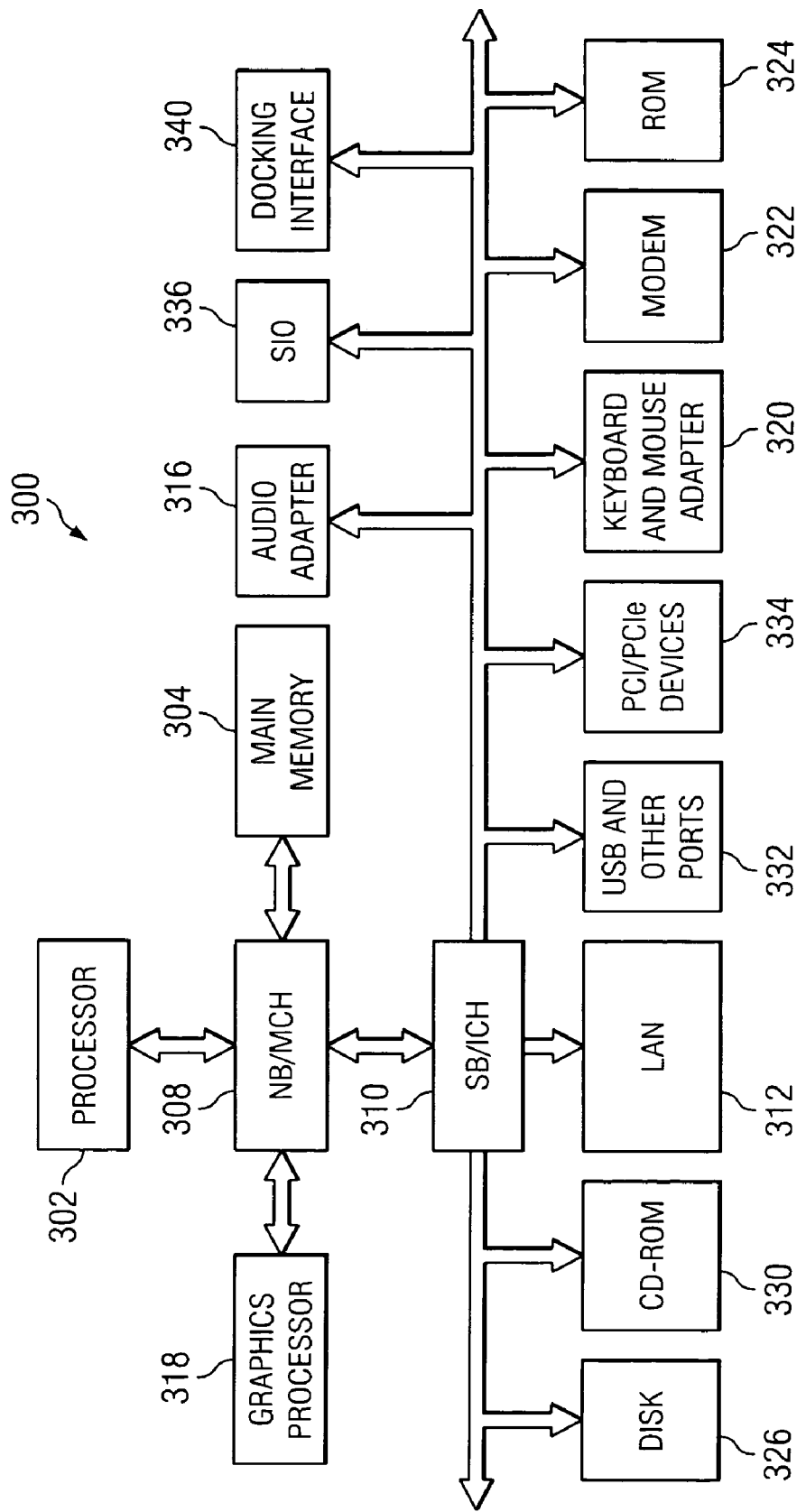
FIG. 3 is a block diagram of a data processing system in which the present invention may be implemented.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system. For example, data processing system 300 may be a point-of-sale terminal or credit card processing terminal. The depicted example in FIG. 3 and above-described examples are not meant to imply architectural limitations.

Figure 4A:
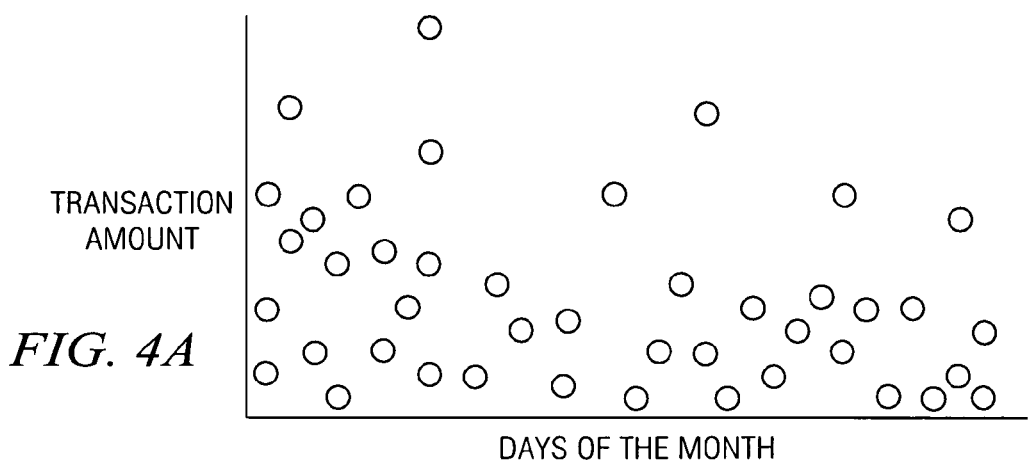
FIGS. 4A-4F are graphical depictions of example behavior data and associated data models in accordance with a preferred embodiment of the present invention.
Figure 4B:
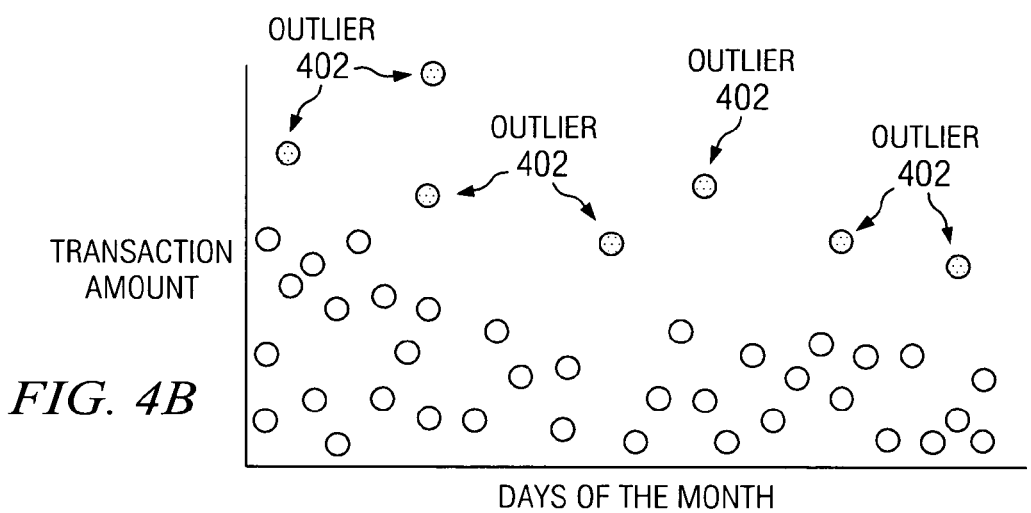

FIGS. 4A-4F are graphical depictions of example behavior data and associated data models in accordance with a preferred embodiment of the present invention. FIG. 4A illustrates example historical behavior data taking the form of transaction amounts and corresponding days of the month on which the transactions occur. The fraud detection mechanism of the present invention analyzes the historical data and develops a first data model using historical behavioral and transactional data using data-driven and statistical techniques.

Data mining allows a user to search large databases and to discover hidden patterns in the data. Data mining is thus the efficient discovery of valuable, non-obvious information from a large collection of data and centers on the automated discovery of new facts and underlying relationships in the data. The term "data mining" comes from the idea that information is the raw material, and the data mining algorithm is the excavator, shifting through the vast quantities of raw data looking for the valuable nuggets of information.

As the present invention relies extensively on the relatively new field of data mining and uses data mining algorithms without proffering a new data mining algorithm per se, a discussion of the general techniques and purposes of data mining are herein provided before a detailed discussion of the implementation of the present invention.

Background on Data Mining:

Data mining is a process for extracting relationships in data stored in database systems. As is well-known, users can query a database system for low-level information, such as the value of a particular property of a transaction during the last month. Data mining systems, on the other hand, can build a set of high-level rules about a set of data, such as "If the transaction takes place within one hour of another transaction and the amount of the transaction is greater than $1000, then the probability that the transaction is fraudulent is greater than 50%." These rules allow a financial institution to better understand the relationship between amount data and time data for a transaction and allow the financial institution to make queries, such as "Which transactions are likely to be fraudulent?" This type of knowledge allows for fraud detection and helps to guide other strategic decisions to prevent fraud. Other applications of data mining include market data analysis, medical diagnosis, scientific tasks, VLSI design, analysis of manufacturing processes, etc. Data mining involves many aspects of computing, including, but not limited to, database theory, statistical analysis, artificial intelligence, and parallel/distributed computing.

Data mining may be categorized into several tasks, such as association, classification, and clustering. There are also several knowledge discovery paradigms, such as rule induction, instance-based learning, neural networks, and genetic algorithms. Many combinations of data mining tasks and knowledge discovery paradigms are possible within a single application.

Data Mining Tasks:

An association rule may be developed based on a set of data for which an attribute is determined to be either present or absent. For example, suppose data has been collected on a set of credit card transactions and the attributes are day of the month and amount. The goal is to discover any association rules between the day of the month and the amount of transactions made on the day of the month. Specifically, given two non-intersecting sets of items, e.g., sets X and Y, one may attempt to discover whether there is a rule "if X is the first of the month, then Y is greater than $100," and the rule is assigned a measure of support and a measure of confidence that is equal or greater than some selected minimum levels. The measure of support is the ratio of the number of records where X is the first of the month and Y is greater than $100, divided by the total number of records. The measure of confidence is the ratio of the number of records where X is the first of the month and Y is greater than $100, divided by the number of records where X is the first of the month. Due to the smaller number of records in the denominators of these ratios, the minimum acceptable confidence level is higher than the minimum acceptable support level. Returning to credit card transactions as an example, the minimum support level may be set at 0.3 and the minimum confidence level set at 0.8. An example rule in a set of credit card transaction information that meets these criteria might be "if the day of the month is the first, then the amount of the transaction is greater than $100."

Given a set of data and a set of criteria, the process of determining associations is completely deterministic. Since there are a large number of subsets possible for a given set of data and a large amount of information to be processed, most research has focused on developing efficient algorithms to find all associations. However, this type of inquiry leads to the following question: Are all discovered associations really significant? Although some rules may be interesting, one finds that most rules may be uninteresting since there is no cause and effect relationship. For example, the association "if the day of the month is the first, then the amount of the transaction is greater than $100" would also be a reported association with exactly the same support and confidence values as the association "if the amount of the transaction is greater than $100, then the day of the month is the first."

Classification tries to discover rules that predict whether a record belongs to a particular class based on the values of certain attributes. In other words, given a set of attributes, one attribute is selected as the "goal," and one desires to find a set of "predicting" attributes from the remaining attributes. For example, suppose it is desired to know whether a particular credit card transaction is potentially fraudulent. For example, a rather trivial example of this type of rule could include "If the amount of the transaction is less than $10, the transaction is not fraudulent." A set of data is presented to the system based on past knowledge; this data "trains" the system. The goal is to produce rules that will predict behavior for a future class of data. The main task is to design effective algorithms that discover high quality knowledge. Unlike an association in which one may develop definitive measures for support and confidence, it is much more difficult to determine the quality of a discovered rule based on classification.

A problem with classification is that a rule may, in fact, be a good predictor of actual behavior but not a perfect predictor for every single instance. One way to overcome this problem is to cluster data before trying to discover classification rules. To understand clustering, consider a simple case were two attributes are considered: day of the month and transaction amount. These data points can be plotted on a two-dimensional graph, such as that shown in FIG. 4A. Given this plot, clustering is an attempt to discover or "invent" new classes based on groupings of similar records. For example, for the above attributes, a clustering of data in the range of the first to the seventh for the day of the month might be found for $1000 to $1500. This cluster could then be treated as a single class.

Clusters of data represent subsets of data where members behave similarly but not necessarily the same as the entire population. In discovering clusters, all attributes are considered equally relevant. Assessing the quality of discovered clusters is often a subjective process. Clustering is often used for data exploration and data summarization.

Knowledge Discovery Paradigms:

There are a variety of knowledge discovery paradigms, some guided by human users, e.g. rule induction and decision trees, and some based on AI techniques, e.g. neural networks. The choice of the most appropriate paradigm is often application dependent.

On-line analytical processing (OLAP) is a database-oriented paradigm that uses a multidimensional database where each of the dimensions is an independent factor, e.g., day of the month vs. transaction amount vs. geographic location. There are a variety of operators provided that are most easily understood if one assumes a three-dimensional space in which each factor is a dimension of a vector within a three-dimensional cube. One may use "pivoting" to rotate the cube to see any desired pair of dimensions. "Slicing" involves a subset of the cube by fixing the value of one dimension. "Roll-up" employs higher levels of abstraction, e.g. moving from transaction amount-by-month to transaction amount-by-day of the month, and "drill-down" goes to lower levels, e.g. moving from transaction amount-by-day of the month to transaction amount-by-time of day.

The Data Cube operation computes the power set of the "Group by" operation provided by SQL. For example, given a three dimensional cube with dimensions A, B, C, then Data Cube computes Group by A, Group by B, Group by C, Group by A, B, Group by A, C, Group by B, C, and Group by A, B, C. OLAP is used by human operators to discover previously undetected knowledge in the database.

Recall that classification rules involve predicting attributes and the goal attribute. Induction on classification rules involves specialization, i.e. adding a condition to the rule antecedent, and generalization, i.e. removing a condition from the antecedent. Hence, induction involves selecting what predicting attributes will be used. A decision tree is built by selecting the predicting attributes in a particular order, e.g., day of the month, geographic location, transaction amount.

The decision tree is built top-down assuming all records are present at the root and are classified by each attribute value going down the tree until the value of the goal attribute is determined. The tree is only as deep as necessary to reach the goal attribute. For example, if no credit card transactions on the $28^{th}$ of the month have a transaction amount greater than $100, then the value of the goal attribute "Transaction value greater than $100?" would be determined (value equals "No") once the day of the month is known to be the $28^{th}$. However, if the day of the month is the $21^{st}$, it may be necessary to look at other predicting attributes to determine the value of the goal attribute. A human is often involved in selecting the order of attributes to build a decision tree based on "intuitive" knowledge of which attribute is more significant than other attributes.

Decision trees can become quite large and often require pruning, i.e. cutting off lower level subtrees. Pruning avoids "overfitting" the tree to the data and simplifies the discovered knowledge. However, pruning too aggressively can result in "underfitting" the tree to the data and missing some significant attributes.

The above techniques provide tools for a human to manipulate data until some significant knowledge is discovered and removes some of the human expert knowledge interference from the classification of values. Other techniques rely less on human intervention. Instance-based learning involves predicting the value of a tuple, e.g., predicting if someone of a particular age and gender will buy a product, based on stored data for known tuple values. A distance metric is used to determine the values of the N closest neighbors, and these known values are used to predict the unknown value.

For example, given a particular day of the month and transaction amount in which the tuple value is not known, if among the 20 nearest neighbors, 15 transactions showed a particular transaction amount range and 5 samples did not, then it might be predicted that the value of this new tuple would be "has transaction amount of X to Y." This technique does not discover any new rules, but it does provide an explanation for the classification, namely the values of the closest neighbors.

The final technique examined is neural nets. A typical neural net includes an input layer of neurons corresponding to the predicting attributes, a hidden layer of neurons, and an output layer of neurons that are the result of the classification. For example, there may be eight input neurons corresponding to "transaction amount under $100," "transaction amount between $100 and $200," "transaction amount over $200," "on the first of the month," "within 50 miles of home zip code," "more than 50 miles from home zip code," and "within one hour of last transaction." There could be two output neurons: "fraudulent transaction" and "non-fraudulent transactoin." A reasonable number of neurons in the middle layer is determined by experimenting with a particular known data set.

There are interconnections between the neurons at adjacent layers that have numeric weights. When the network is trained, meaning that both the input and output values are known, these weights are adjusted to give the best performance for the training data. The "knowledge" is very low level (the weight values) and is distributed across the network. This means that neural nets do not provide any comprehensible explanation for their classification behavior—they simply provide a predicted result.

Neural nets may take a very long time to train, even when the data is deterministic. For example, to train a neural net to recognize an exclusive- or relationship between two Boolean variables may take hundreds or thousands of training data (the four possible combinations of inputs and corresponding outputs repeated again and again) before the neural net learns the circuit correctly. However, once a neural net is trained, it is very robust and resilient to noise in the data. Neural nets have proved most useful for pattern recognition tasks, such as recognizing handwritten digits in a zip code.

Outlier analysis is used to find records where some of the attribute values are quite different from the expected values. For example, outlier analysis may be used to find transactions with unusually high amounts or unusual geographic locations. Outliers are often viewed as significant data points. For example, if an account holder never makes a credit card purchase over $1000 and then a credit card purchase of $5000 occurs, this could be an indication of fraudulent activity.

Other knowledge discovery paradigms can be used, such as genetic algorithms. However, the above discussion presents the general issues in knowledge discovery. Some techniques are heavily dependent on human guidance while others are more autonomous. The selection of the best approach to knowledge discovery is heavily dependent on the particular application.

Data Warehousing:

The above discussions focused on data mining tasks and knowledge discovery paradigms. There are other components to the overall knowledge discovery process.

Data warehousing is the first component of a knowledge discovery system and is the storage of raw data itself. One of the most common techniques for data warehousing is a relational database. However, other techniques are possible, such as hierarchical databases or multidimensional databases. Data is nonvolatile, i.e. read-only, and often includes historical data. The data in the warehouse needs to be "clean" and "integrated". Data is often taken from a wide variety of sources. To be clean and integrated means data is represented in a consistent, uniform fashion inside the warehouse despite differences in reporting the raw data from various sources.

There also has to be data summarization in the form of a high level aggregation. For example, consider a phone number 111-222-3333 where 111 is the area code, 222 is the exchange, and 3333 is the phone number. The telephone company may want to determine if the inbound number of calls is a good predictor of the outbound number of calls. It turns out that the correlation between inbound and outbound calls increases with the level of aggregation. In other words, at the phone number level, the correlation is weak but as the level of aggregation increases to the area code level, the correlation becomes much higher.

Data Pre-Processing:

After the data is read from the warehouse, it is pre-processed before being sent to the data mining system. The two pre-processing steps discussed below are attribute selection and attribute discretization.

Selecting attributes for data mining is important since a database may contain many irrelevant attributes for the purpose of data mining, and the time spent in data mining can be reduced if irrelevant attributes are removed beforehand. Of course, there is always the danger that if an attribute is labeled as irrelevant and removed, then some truly interesting knowledge involving that attribute will not be discovered.

If there are N attributes to choose from, then there are $2^N$ possible subsets of relevant attributes. Selecting the best subset is a nontrivial task. There are two common techniques for attribute selection. The filter approach is fairly simple and independent of the data mining technique being used. For each of the possible predicting attributes, a table is made with the predicting attribute values as rows, the goal attribute values as columns, and the entries in the table as the number of tuples satisfying the pairs of values. If the table is fairly uniform or symmetric, then the predicting attribute is probably irrelevant. However, if the values are asymmetric, then the predicting attribute may be significant.

The second technique for attribute selection is called a wrapper approach where attribute selection is optimized for a particular data mining algorithm. The simplest wrapper approach is Forward Sequential Selection. Each of the possible attributes is sent individually to the data mining algorithm and its accuracy rate is measured. The attribute with the highest accuracy rate is selected. Suppose attribute 3 is selected; attribute 3 is then combined in pairs with all remaining attributes, i.e., 3 and 1, 3 and 2, 3 and 4, etc., and the best performing pair of attributes is selected.

This hill climbing process continues until the inclusion of a new attribute decreases the accuracy rate. This technique is relatively simple to implement, but it does not handle interaction among attributes well. An alternative approach is backward sequential selection that handles interactions better, but it is computationally much more expensive.

Discretization involves grouping data into categories. For example, age in years might be used to group persons into categories such as minors (below 18), young adults (18 to 39), middle-agers (40-59), and senior citizens (60 or above). Some advantages of discretization are that it reduces the time for data mining and improves the comprehensibility of the discovered knowledge. Categorization may actually be required by some mining techniques. A disadvantage of discretization is that details of the knowledge may be suppressed.

Blindly applying equal-weight discretization, such as grouping ages by 10 year cycles, may not produce very good results. It is better to find "class-driven" intervals. In other words, one looks for intervals that have uniformity within the interval and have differences between the different intervals.

Data Post-Processing:

The number of rules discovered by data mining may be overwhelming, and it may be necessary to reduce this number and select the most important ones to obtain any significant results. One approach is subjective or user-driven. This approach depends on a human's general impression of the application domain. For example, the human user may propose a rule such as "if a transaction has a transaction amount that is less than $10, then the transaction has a lower chance of being fraudulent." The discovered rules are then compared against this general impression to determine the most interesting rules. Often, interesting rules do not agree with general expectations. For example, although the conditions are satisfied, the conclusion is different than the general expectations. Another example is that the conclusion is correct, but there are different or unexpected conditions.

Rule affinity is a more mathematical approach to examining rules that does not depend on human impressions. The affinity between two rules in a set of rules $\{R_i\}$ is measured and given a numerical affinity value between zero and one, called $Af(R_x, R_y)$. The affinity value of a rule with itself is always one, while the affinity with a different rule is less than one. Assume that one has a quality measure for each rule in a set of rules $\{R_i\}$, called $Q(R_i)$. A rule $R_j$ is said to be suppressed by a rule $R_k$ if $Q(R_j) < Af(R_j, R_k) \cdot Q(R_k)$. Notice that a rule can never be suppressed by a lower quality rule since one assumes that $Af(R_j, R_k) < 1$ if $j = k$. One common measure for the affinity function is the size of the intersection between the tuple sets covered by the two rules, i.e. the larger the intersection, the greater the affinity.

Data Mining Summary:

The discussion above has touched on the following aspects of knowledge processing: data warehousing, pre-processing data, data mining itself, and post-processing to obtain the most interesting and significant knowledge. With large databases, these tasks can be very computationally intensive, and efficiency becomes a major issue. Much of the research in this area focuses on the use of parallel processing. Issues involved in parallelization include how to partition the data, whether to parallelize on data or on control, how to minimize communications overhead, how to balance the load between various processors, how to automate the parallelization, how to take advantage of a parallel database system itself, etc.

Many knowledge evaluation techniques involve statistical methods or artificial intelligence or both. The quality of the knowledge discovered is highly application dependent and inherently subjective. A good knowledge discovery process should be both effective, i.e. discovers high quality knowledge, and efficient, i.e. runs quickly.

Integrating Statistical Analysis and Discovery Based Data Mining Analysis to Perform Fraud Detection:

Returning to FIG. 4A, fraud detection mechanism of the present invention performs statistical analysis and discover based data mining analysis to identify control points within the historical data. More particularly, data points that deviate from normal activity (i.e., outliers) may be considered to be significant data points individually; however, taken a group, outliers within a system of data-driven models may be the basis for the "electronic fence." Turning to FIG. 4B, outliers 402 are identified. These values are statistically different from the expected values based on the historical data.

In an exemplary embodiment of the present invention, outliers may be used to identify control points for the data model. The fraud detection mechanism of the present invention may perform data mining techniques to determine which outliers are least likely to represent fraudulent transactions. These data points may be identified as control points. Validation of data points as fraudulent or non-fraudulent may be accomplished using data mining techniques or through other methods. For example, the data mining techniques may determine that a particular transaction occurs in Hong Kong and that the account holder occasionally travels to China. In this case, the transaction may be more likely to be valid. However, the data mining techniques may determine that a recent valid transaction occurred in New York City. It is unlikely that the account holder has made a transaction in New York City and, in a short time, also made a transaction in Hong Kong. Therefore, the transaction occurring in Hong Kong may be flagged as potentially fraudulent behavior unless it can be determined valid by other means and behavior. For example, if the transaction was made over the Internet, the transaction may be assumed to be valid, even though the transaction is executed in Hong Kong.

Occasionally, transactions may need to be validated manually. For example, when a large purchase is made, a credit card issuer may telephone the account holder to verify the transaction before paying the merchant. Similar transactions that occurred in the past may also have been disputed by the account holder. This information may be part of the historical data and may be discovered through data mining. However, manual techniques for verifying whether a data point is fraudulent or acceptable may also be used.

Figure 4C:
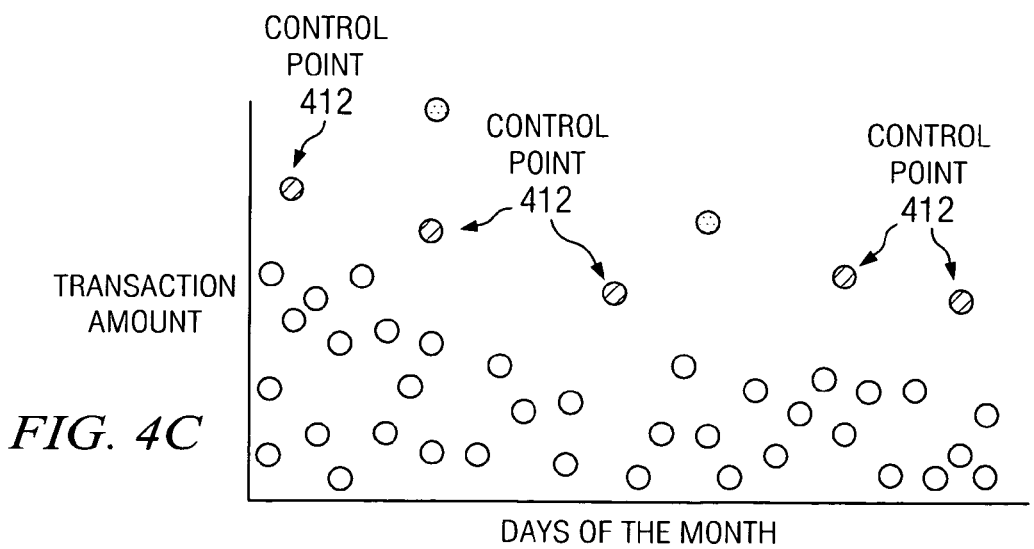
Figure 4D:
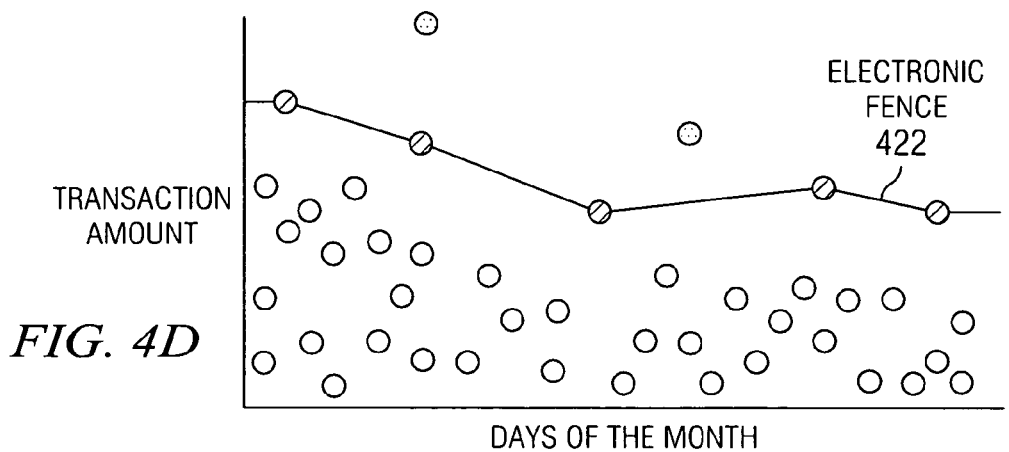

FIG. 4C shows control points 412, which are outliers that are determined to be least likely to represent fraudulent transactions. Other techniques may also be used to identify control points. For example, the fraud detection mechanism may alternatively use outliers that are determined to represent potentially fraudulent transactions as control points. The technique for identifying control points may be decided upon based upon the desires of the enterprise. For example, an enterprise may accept a loose model to prevent false positives initially when detecting fraudulent activity. On the other hand, an enterprise may require a constrictive data model to minimize undesirable behavior knowing false positives will likely exist.

The identified control points are used to form an "electronic fence," wherein data points within the fence represent acceptable behavior and data points outside the fence represent unacceptable behavior. As shown in FIG. 4C, electronic fence 422 passes through the control points to define a boundary between acceptable behavior and potentially fraudulent behavior. Individual transactions may be approved or denied based upon whether the data points for the transactions fall inside or outside the fence.

In accordance with a preferred embodiment of the present invention, the data model(s), or electronic fence, is dynamic and its initial control points are not selected manually, but are determined through a series of data-driven techniques. Frequently, the mechanism of the present invention will receive current and updated environmental, transactional, and psychographic data. The present invention validates the current data using data mining techniques and statistical methods, as discussed above. The data model, or "electronic fence," is refined based on the current data input.

Figure 4E:
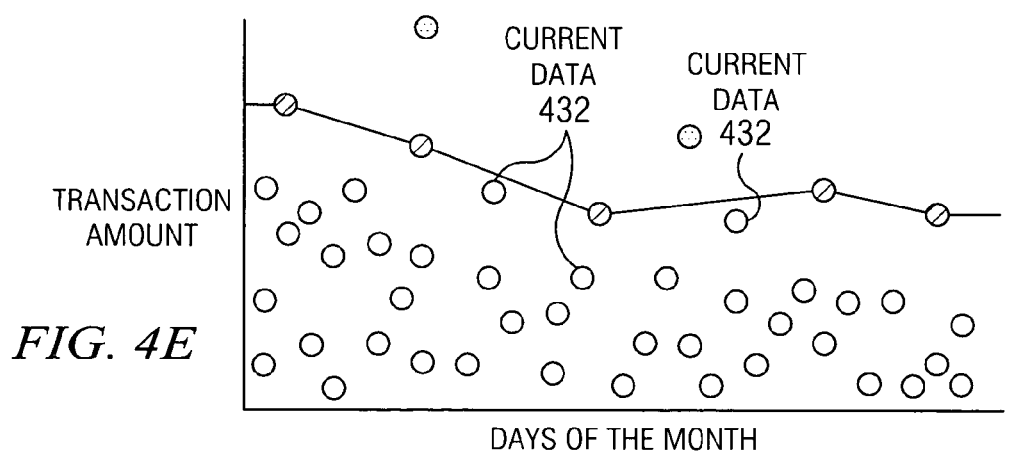
Figure 4F:
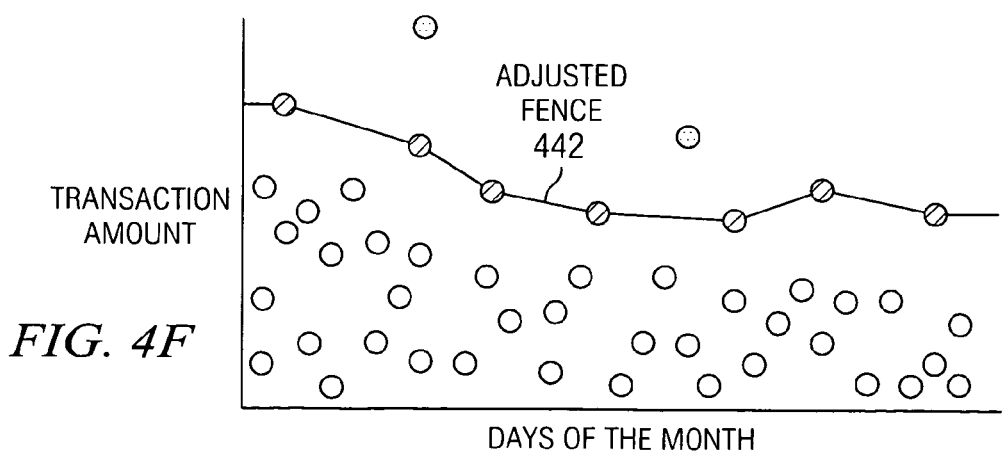

With reference now to FIG. 4E, current data points 432 are received. The mechanism of the present invention analyzes the current data points and identifies outliers. The present invention then identifies valid and invalid (potentially fraudulent) outliers. These data points are used to identify control points in the data model. Then, the mechanism of the present invention adjusts the electronic fence. FIG. 4F shows the data model with adjusted fence 442. The data model may be adjusted at an interval selected by the institution. For example, one enterprise may adjust data models once a year, while another enterprise may require that the data model be adjusted once a month or once a week. Alternatively, the frequency with which data models are revised may be determined based upon the volatility of the data.

In accordance with an exemplary embodiment of the present invention, the process of refining the data model will be iterated until a set of limits is achieved. A typical limit, for example, is generally based on two standard deviations from the mean within a normal distribution of the data; however, other stopping mechanisms (limits) can and may be employed within this model. The data model reaches a steady state when the data model changes by a small amount or "delta" that is less than the threshold set. When this occurs, the model may be treated as a static model. However, if the system's data becomes volatile and begins to show that it is operating outside the threshold which is set, the process of refining the data model will be invoked again to adjust the data model to the new behavior.

While the examples shown in FIGS. 4A-4F illustrate a data model based upon transaction amounts versus days of the month, other variables may be used to build a data model. For example, the data model may be based upon location, time of day, day of the week, types and combinations of products being purchased, etc. Data models may also be based upon personal information, such as sex, age, occupation, marital status, and the like. For other types of fraud detection, loan amount, credit worthiness, time since last loan, etc. may be used. Data models may be multi-dimensional. For example, a data model may be built for transaction amount versus time since last transaction and distance from last transaction. Other variations of the data models illustrated in FIGS. 4A-4F may be readily apparent to a person of ordinary skill in the art and are within the scope of the present invention.

Figure 5:
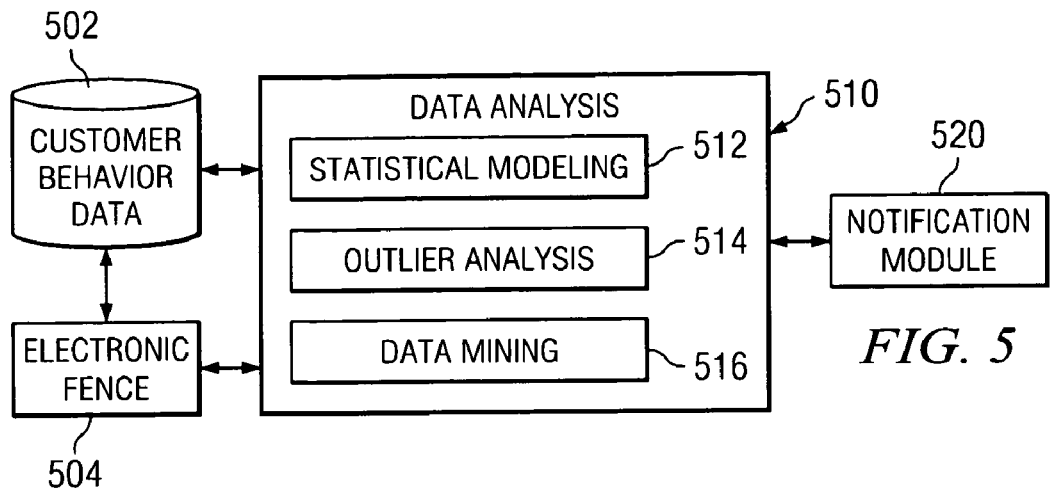
FIG. 5 is a block diagram illustrating a fraud detection system in accordance with a preferred embodiment of the present invention.

FIG. 5 is a block diagram illustrating a fraud detection system in accordance with a preferred embodiment of the present invention. The fraud detection system includes data analysis 510, which analyzes customer behavior data 502. The customer behavior data may include historical and current transaction, environmental, and psychographic data. Data analysis 510 includes statistical modeling 512, outlier analysis 514, and other data mining algorithms 516.

The data analysis module initially analyzes historical data in customer behavior data 502 and generates the electronic fence 504. Outlier Analysis 514 identifies the outliers in the behavior data and data mining 516 identifies the valid and invalid outliers. The control points for the electronic fence may be validated by statistical modeling 512, if appropriate. Electronic fence 504 is adjusted or revised in the same manner based upon current data from customer behavior data 502.

Current transactions may also be received by data analysis module 510 and compared against electronic fence 504. The transactions are approved or denied based upon whether the data points for the transactions fall inside or outside the electronic fence. The requesting party is notified of approval or denial of transactions through notification module 520.

Figure 6:
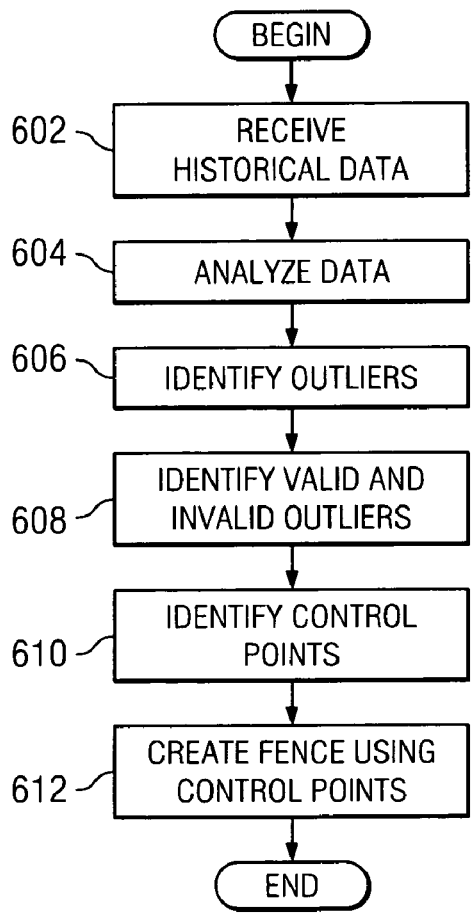
FIG. 6 is a flowchart illustrating the operation of a process for building a data model in accordance with a preferred embodiment of the present invention.

FIG. 6 is a flowchart illustrating the operation of a process for building a data model in accordance with a preferred embodiment of the present invention. The process begins and receives historical data (step 602). The process then analyzes the data (step 604) and identifies outliers in the data (step 606). Next, the process identifies valid and invalid outliers (step 608). The process then identifies control points from the outliers (step 610) and creates a fence using the control points (step 612). Thereafter the process ends.

Figure 7:
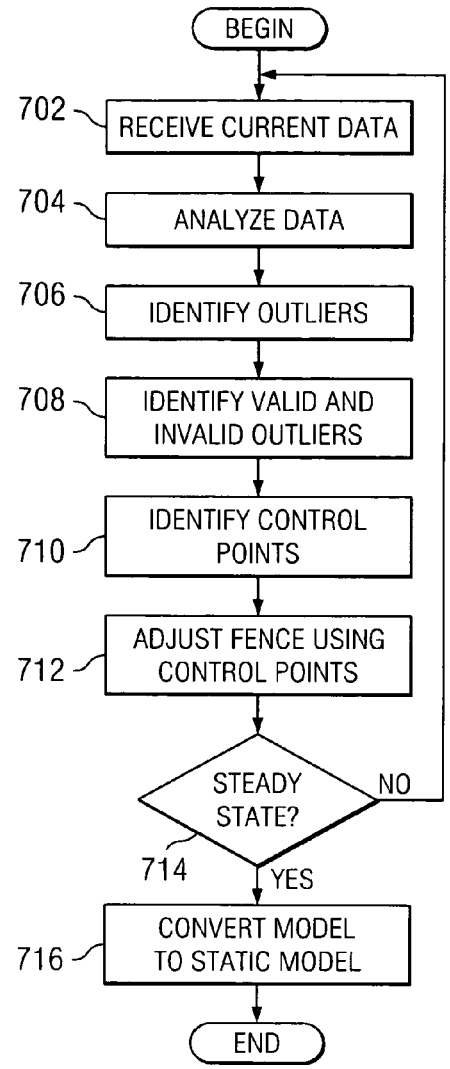
FIG. 7 is a flowchart illustrating the operation of a process for updating a data model in accordance with a preferred embodiment of the present invention.

FIG. 7 is a flowchart illustrating the operation of a process for updating a data model in accordance with a preferred embodiment of the present invention. The process begins and receives current data (step 702). The process then analyzes the data (step 704) and identifies outliers in the data (step 706). Next, the process identifies valid and invalid outliers (step 708). The process then identifies control points from the outliers (step 710) and adjusts the fence using the newly identified control points (step 712).

A determination is then made as to whether the model has reached a steady state (step 714). As discussed above, the model may reach a steady state when a set of limits is achieved. The limit may be, for example, based on two standard deviations from the norm. If the model has not reached a steady state, the process returns to step 702 to receive current data. However, if the model has reached a steady state in step 714, the process converts the model to a static model (716) and ends.

Figure 8:
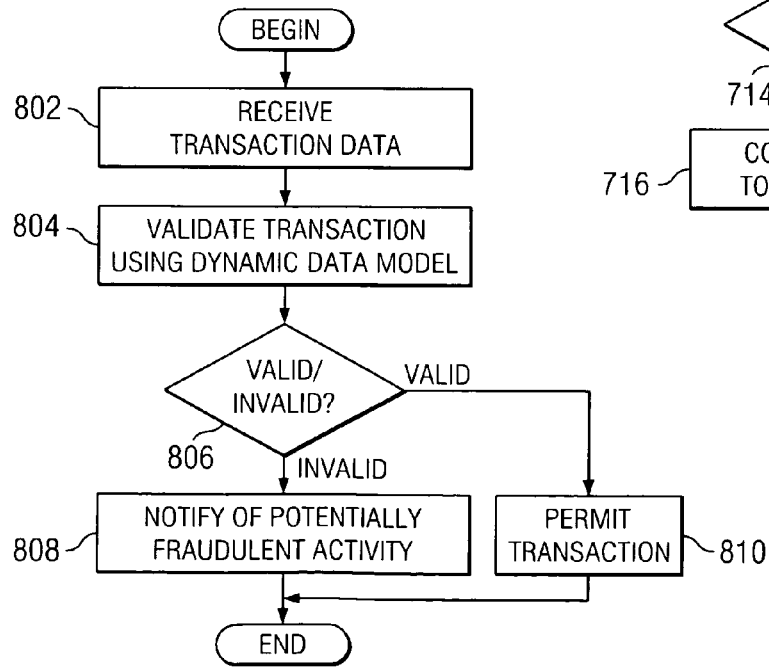
FIG. 8 is a flowchart illustrating the operation of a process for authorizing transactions in accordance with a preferred embodiment of the present invention.

FIG. 8 is a flowchart illustrating the operation of a process for authorizing transactions in accordance with a preferred embodiment of the present invention. The process begins and receives transaction data (step 802). The process validates the transaction using the dynamic data model (step 804) and a determination is made as to whether the transaction is valid or invalid (step 806). This determination may be made, for example, by determining whether a data point for the transaction is inside or outside an electronic fence of the data model. If the transaction is invalid, the process notifies of potentially fraudulent activity (step 808) and ends. However, if the transaction is valid in step 806, the process permits the transaction (step 810) and ends.

Thus, the present invention solves the disadvantages of the prior art by providing a dynamically determined data-driven model for detecting fraudulent behavior where the statistically significant data elements are not known a priori. A first model is developed using mainly data-driven discovery (data mining) on historical data (demographic, psychographic, environmental, transactional) and may be enriched using outside or third-party data sources which then may use additional statistical techniques for model validation. The noise within the distributions of the data determine the initial control points needed for the model(s), which may or may not be optimal. These initial control points define an "electronic fence," wherein data points within the fence represent acceptable behavior and data points outside the fence represent unacceptable behavior. Updated data is received. The present invention validates the current data using data mining techniques and statistical methods. The data model, or "electronic fence," is refined based on the updated data. The process of refining the data model may be iterated until a set of limits is achieved which is defined as a steady state. When the data model reaches a steady state, the model may be treated as a static model. If the behavior becomes volatile, for example begins to operate outside the steady state model, the process of refining the data model is invoked to adjust the data model to the new behavior.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method, in a data processing system, for detecting fraud, the computer implemented method comprising:

a plurality of steps performed by a processor in the data processing system, the plurality of steps comprising:

receiving a set of historical data stored in a customer behavior database;

identifying a plurality of control points in the set of historical data using a data analysis module, further comprising:

performing a statistical analysis on the set of historical data for identifying a plurality of outliers, wherein the plurality of outliers are identified by the statistical analysis as a set of significantly different data points in a distribution of the set of historical data; and performing data mining techniques on the plurality of outliers to distinguish between a first set of outliers and a second set of outliers, wherein the first set of outliers are classified by the data mining techniques as non-fraudulent outliers and the second set of outliers are classified by the data mining techniques as fraudulent outliers, and wherein the first set of outliers are identified as the plurality of control points;

building at least one data model based on the plurality of control points, further comprising:

generating a fence that passes through the plurality of control points to define a boundary between data points, wherein the fence comprises line segments connecting the plurality of control points to form a continuous line for the boundary, and wherein data points inside or on the boundary of the fence represent acceptable behavior and data points outside the boundary of the fence represent fraudulent behavior;

receiving a set of updated data, wherein the set of updated data includes a plurality of current data stored in the customer behavior database;

identifying one or more new control points based on the set of updated data using the data analysis module, further comprising:

performing a statistical analysis on the set of updated data for identifying an additional plurality of outliers, wherein the additional plurality of outliers are identified by the statistical analysis as an additional set of significantly different data points in a distribution of the set of updated data; and performing data mining techniques on the additional plurality of outliers to distinguish between a third set of outliers and a fourth set of outliers, wherein the third set of outliers are classified by the data mining techniques as non-fraudulent outliers and the fourth set of outliers are classified by the data mining techniques as fraudulent outliers, and wherein the third set of outliers are identified as the one or more new control points;

adjusting the at least one data model to form an adjusted fence, within the at least one data model, based on the one or more new control points, wherein the at least one data model is refined for a plurality of iterations, further comprising:

generating the adjusted fence that passes through the plurality of control points and the one or more new control points to define a new boundary between data points, wherein the adjusted fence comprises line segments connecting the plurality of control points and the one or more new control points to form a new continuous line for the new boundary, and wherein data points inside or on the new boundary of the adjusted fence represent acceptable behavior and data points outside the new boundary of the adjusted fence represent fraudulent behavior; and verifying a transaction based on the adjusted fence.

2. The computer implemented method of claim 1, wherein the set of historical data includes at least one of demographic data, psychographic data, transactional data, and environmental data.

3. The computer implemented method of claim 1, wherein the plurality of outliers in the distribution of the set of historical data are identified by analyzing the historical data using statistical modeling, outlier analysis, and data mining algorithms.

4. The computer implemented method of claim 1, wherein the set of updated data includes at least one of demographic data, psychographic data, transactional data, and environmental data.

5. The computer implemented method of claim 1, wherein generating the adjusted fence includes:

adding the one or more new control points to the adjusted fence.

6. The computer implemented method of claim 1, wherein generating the adjusted fence includes:

changing one or more of the plurality of control points to the one or more new control points in the adjusted fence.

7. The computer implemented method of claim 1, further comprising:

determining whether the adjusted fence, within the at least one data model, reached a steady state;

converting the adjusted fence to a static model in response to a determination that the adjusted fence reached the steady state; and refining the at least one data model for an iteration of the plurality of iterations in response to a determination that the adjusted fence has not reached the steady state.

8. The computer implemented method of claim 7, wherein determining whether the adjusted fence reached a steady state includes:

determining a difference between the adjusted fence and a previous data model, within the at least one data model, to form a delta value; and determining whether the delta value is less than a threshold.

9. The computer implemented method of claim 8, wherein the threshold is two standard deviations from a mean within a normal distribution of data.

10. A program storage device readable by a machine, tangibly embodying a program of instructions executable by the machine to detect fraudulent activity, said method steps comprising:

receiving a set of historical data stored in a customer behavior database;

identifying a plurality of control points in the set of historical data using a data analysis module, further comprising:

identifying a plurality of control points in the set of historical data using a data analysis module, further comprising:

performing a statistical analysis on the set of historical data for identifying a plurality of outliers, wherein the plurality of outliers are identified by the statistical analysis as a set of significantly different data points in a distribution of the set of historical data; and performing data mining techniques on the plurality of outliers to distinguish between a first set of outliers and a second set of outliers, wherein the first set of outliers are classified by the data mining techniques as non-fraudulent outliers and the second set of outliers are classified by the data mining techniques as fraudulent outliers, and wherein the first set of outliers are identified as the plurality of control points;

instructions for building at least one data model based on the plurality of control points, further comprising:

generating a fence that passes through the plurality of control points to define a boundary between data points, wherein the fence comprises line segments connecting the plurality of control points to form a line for the boundary, and wherein data points inside or on the boundary of the fence represent acceptable behavior and data points outside the boundary of the fence represent fraudulent behavior;

receiving a set of updated data, wherein the set of updated data includes a plurality of current data stored in the customer behavior database;

identifying one or more new control points based on the set of updated data using the data analysis module, further comprising:

performing a statistical analysis on the set of updated data for identifying an additional plurality of outliers, wherein the additional plurality of outliers are identified by the statistical analysis as an additional set of significantly different data points in a distribution of the set of updated data; and performing data mining techniques on the additional plurality of outliers to distinguish between a third set of outliers and a fourth set of outliers, wherein the third set of outliers are classified by the data mining techniques as non-fraudulent outliers and the fourth set of outliers are classified by the data mining techniques as fraudulent outliers, and wherein the third set of outliers are identified as the one or more new control points;

adjusting the at least one data model to form an adjusted fence, within the at least one data model, based on the one or more new control points, wherein the at least one data model is refined for a plurality of iterations, further comprising:

generating the adjusted fence that passes through the plurality of control points and the one or more new control points to define a new boundary between data points, wherein the adjusted fence comprises line segments connecting the plurality of control points and the one or more new control points to form a new continuous line for the new boundary, and wherein data points inside or on the new boundary of the adjusted fence represent acceptable behavior and data points outside the new boundary of the adjusted fence represent fraudulent behavior; and verifying a transaction based on the adjusted fence.

11. The program storage device of claim 10, wherein the set of historical data includes at least one of demographic data, psychographic data, transactional data, and environmental data.

12. The program storage device of claim 10, wherein the plurality of outliers in the distribution of the set of historical data are identified by analyzing the set of historical data using statistical modeling, outlier analysis, and data mining algorithms.

13. The program storage device of claim 10, wherein the set of updated data includes at least one of demographic data, psychographic data, transactional data, and environmental data.

14. The program storage device of claim 10, wherein generating the adjusted fence include:

adding the one or more new control points to the adjusted fence.

15. The program storage device of claim 10, wherein generating the adjusted fence include:

changing one or more of the plurality of control points to the one or more new control points in the adjusted fence.

16. The program storage device of claim 10, further comprising:

determining whether the adjusted fence, within the at least one data model, reached a steady state;

converting the adjusted fence to a static model in response to a determination that the adjusted fence reached the steady state; and refining the at least one data model for an iteration of the plurality of iterations in response to a determination that the adjusted fence has not reached the steady state.

17. The program storage device of claim 16, wherein determining whether the adjusted fence reached a steady state includes:

determining a difference between the adjusted fence and a previous data model, within the at least one data model, to form a delta value; and determining whether the delta value is less than a threshold.

18. The program storage device of claim 17, wherein the threshold is two standard deviations from a mean within a normal distribution of data.

19. An apparatus for detecting fraud, the apparatus comprising:

a processor, and instructions stored in a memory, wherein the instructions are adapted to cause the processor to perform a plurality of steps comprising:

receiving a set of historical data stored in a customer behavior database;

identifying a plurality of control points in the set of historical data using a data analysis module, further comprising:

performing a statistical analysis on the set of historical data for identifying a plurality of outliers, wherein the plurality of outliers are identified by the statistical analysis as a set of significantly different data points in a distribution of the set of historical data; and performing data mining techniques on the plurality of outliers to distinguish between a first set of outliers and a second set of outliers, wherein the first set of outliers are classified by the data mining techniques as non-fraudulent outliers and the second set of outliers are classified by the data mining techniques as fraudulent outliers, and wherein the first set of outliers are identified as the plurality of control points;

building at least one data model based on the plurality of control points, further comprising:

generating a fence that passes through the plurality of control points to define a boundary between data points, wherein the fence comprises line segments connecting the plurality of control points to form a continuous line for the boundary, and wherein data points inside or on the boundary of the fence represent acceptable behavior and data points outside the boundary of the fence represent fraudulent behavior;

receiving a set of updated data, wherein the set of updated data includes a plurality of current data stored in the customer behavior database;

identifying one or more new control points based on the set of updated data using the data analysis module, further comprising:

performing a statistical analysis on the set of updated data for identifying an additional plurality of outliers, wherein the additional plurality of outliers are identified by the statistical analysis as an additional set of significantly different data points in a distribution of the set of updated data; and performing data mining techniques on the additional plurality of outliers to distinguish between a third set of outliers and a fourth set of outliers, wherein the third set of outliers are classified by the data mining techniques as non-fraudulent outliers and the fourth set of outliers are classified by the data mining techniques as fraudulent outliers, and wherein the third set of outliers are identified as the one or more new control points;

adjusting the at least one data model to form an adjusted fence, within the at least one data model, based on the one or more new control points, wherein the at least one data model is refined for a plurality of iterations, further comprising:

generating the adjusted fence that passes through the plurality of control points and the one or more new control points to define a new boundary between data points, wherein the adjusted fence comprises line segments connecting the plurality of control points and the one or more new control points to form a new continuous line for the new boundary, and wherein data points inside or on the new boundary of the adjusted fence represent acceptable behavior and data points outside the new boundary of the adjusted fence represent fraudulent behavior; and verifying a transaction based on the adjusted fence.

\* \* \* \* \*